May 17, 1932.  R. D. BAIN ET AL  1,858,978
MOLD AND PROCESS FOR THE PRODUCTION OF PRINTING PLATES FROM RUBBER
Filed Dec. 11, 1928
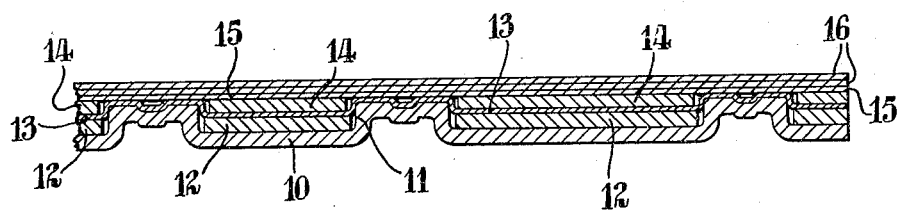
Inventors:
Robert Davos Bain and
James Nelson
by Emil Bonnelycke
Attorney Patented May 17, 1932

1,858,978

UNITED STATES PATENT OFFICE

ROBERT DAVOS BAIN AND JAMES NELSON, OF LONDON, ENGLAND, ASSIGNORS TO LAMSON PARAGON SUPPLY COMPANY LIMITED, OF LONDON, ENGLAND

MOLD AND PROCESS FOR THE PRODUCTION OF PRINTING PLATES FROM RUBBER

Application filed December 11, 1928, Serial No. 325,387, and in Great Britain May 18, 1928.

This invention relates to the manufacture of rubber plates for use in printing by molding such plates, from flong molds similar to those used in the stereotyping industry for casting plates with stereo metal.

It has been proposed to produce printing surfaces by molding from plastic materials such as celluloid, hard rubber, etc., by a process in which a layer of the plastic material is forced by steam or other hot fluid into a flong matrix and is cooled in the mold. Ordinary flong molds, however, when employed for molding rubber plates have the disadvantage that they are apt to collapse or to become deformed when subjected to the pressure and temperature necessary to vulcanize a rubber sheet into the mold and moreover the flong tissue is liable to break away from the surface and to adhere to the vulcanized rubber. Due to these defects rubber plates for use in printing have hitherto commercially been molded from plaster of Paris molds or lead plate molds. These, however, have the disadvantage that they cannot conveniently be kept for repeat work. Plaster molds are moreover liable to break and both plaster molds and lead plate molds are relatively heavy and difficult to store. By enabling the use of flong molds the invention obviously offers great advantages since a flong mold is light and easily handled and can be readily stored for future use and repeat work.

The invention accordingly resides in producing rubber printing plates by molding from a flong mold without impairing the use of the mold for subsequent molding. To this end in order to prevent the mold from collapsing it is appropriately strengthened while the beaten flong is still on the type and moist, preferably by providing a stout backing. Type and the mold thus backed are then placed as usual in a flong drying press. When dry the surface of the mold is also treated to consolidate the flong tissue, to adapt it to resist pressure and heat, and to prevent it from tearing off or from adhering to the rubber. This may be effected by treating the surface of the mold with any appropriate or well-known medium for instance a 2% solution of cellulose nitrate in acetone applied by brushing or in some other manner and allowed to dry. The mold thus ready for molding is then used as a matrix and a sheet of rubber by preference semi-cured is placed thereon and the whole subjected to pressure under heat, use being made preferably of steam or steam heated platens whereby the rubber is simultaneously vulcanized while being forced on to the type impressions of the flong. Rubber plates formed in this manner and sufficiently thick to be resilient may be readily used on flat or rotary printing presses with a minimum of make ready and may be used with either spirit or letterpress inks while the flong mold strengthened and rendered resistant in the manner above suggested may be used over and over again and may be readily stored.

The accompanying drawing shows in section a mold prepared in accordance with the invention.

The flong 10 is first beaten on the type or other printing face in the usual way. After beating, it is preferably treated with an adhesive such as starch paste, and the deep portions 11 filled in with pieces of cardboard 12 or the like cut roughly to size. A piece of blotting paper 13 such as is used in the manufacture of the flong is then placed over the patched back and the whole dried in a mold-drying press.

After removal from the press, it is again similarly patched as at 14, and a suitable number of pieces of backing material 15 such as blotting paper (each preferably individually pasted) are secured to the back. Two or other suitable number of sheets 16 of strong paper, such as kraft paper—gummed together if necessary with gum arabic—are then gummed to the back of the blotting paper 15 and the whole dried in a press preferably heated on both sides. The mold thus dried is now removed from the type and subsequently treated with a protective dope such as a 2% solution of cellulose nitrate in acetone. A flong mold thus produced is then ready for continued use in the production of rubber plates under pressure and heat for an appreciable time.

We claim:

1. A mold for the manufacture of printing plates from semi-cured rubber by vulcanization, consisting of a flong matrix treated with a solution of cellulose nitrate in acetone on its face to prevent tearing thereof, and a backing for said matrix.

2. The process of manufacturing a rubber printing plate which comprises placing a moistened flong on the type to be reproduced, beating said flong, providing the beaten flong while on the type with a stout backing, drying said flong, removing said backed flong from the type, treating the surface thereof with a solution of cellulose nitrate, placing a semi-cured sheet of rubber on said flong, and subjecting said rubber to vulcanization.

3. In the process of manufacturing a flong for a rubber printing plate, the step of treating the face of the flong with a solution of cellulose nitrate.

4. In the process of manufacturing a flong for a rubber printing plate, the step of treating the face of the flong with a 2% solution of cellulose nitrate.

5. In the process of manufacturing a flong for a rubber printing plate, the step of treating the face of the flong with a 2% solution of cellulose nitrate in acetone.

6. In the manufacture of a flong for a rubber printing plate, the step of treating the face with a solution of cellulose nitrate and the step of strengthening the back of the flong by means of a backing.

ROBERT DAVOS BAIN.
JAMES NELSON.